(12) United States Patent
Hiller et al.

(10) Patent No.: US 8,969,428 B2
(45) Date of Patent: Mar. 3, 2015

(54) UV-CURABLE COMPOSITION AND THE USE THEREOF AS A COATING

(75) Inventors: Siegfried Hiller, Unterheinriet (DE); Sevastos Kavanozis, Stuttgart (DE)

(73) Assignee: Karl Woerwag Lack-und Farbenfabrik GmbH & Co. KG (DE)

( * ) Notice: Subject to any disclaimer, the term of this patent is extended or adjusted under 35 U.S.C. 154(b) by 102 days.

(21) Appl. No.: 12/866,924

(22) PCT Filed: Feb. 12, 2009

(86) PCT No.: PCT/EP2009/000960
§ 371 (c)(1),
(2), (4) Date: Sep. 16, 2010

(87) PCT Pub. No.: WO2009/100899
PCT Pub. Date: Aug. 20, 2009

(65) Prior Publication Data
US 2011/0028588 A1   Feb. 3, 2011

(30) Foreign Application Priority Data
Feb. 14, 2008   (DE) .................... 10 2008 010 346

(51) Int. Cl.
C09D 163/10 (2006.01)
C09D 167/06 (2006.01)
C09D 4/00 (2006.01)

(52) U.S. Cl.
CPC .................................. C09D 4/00 (2013.01)
USPC ............. 522/100; 522/77; 522/101; 522/103; 522/104; 522/109; 522/113

(58) Field of Classification Search
USPC .............................. 522/83, 74, 100, 101, 103
See application file for complete search history.

(56) References Cited

U.S. PATENT DOCUMENTS

| | | | |
|---|---|---|---|
| 4,227,979 A * | 10/1980 | Humke et al. .................... 522/14 |
| 4,649,062 A * | 3/1987 | Kosiorek et al. ............... 427/511 |
| 4,925,773 A * | 5/1990 | Miyamura et al. ......... 430/285.1 |
| 5,486,384 A | 1/1996 | Bastian et al. |
| 5,576,361 A * | 11/1996 | Craun ........................... 523/423 |
| 6,168,865 B1 * | 1/2001 | Koster et al. ................... 428/418 |
| 6,211,262 B1 * | 4/2001 | Mejiritski et al. .............. 522/71 |
| 6,261,645 B1 | 7/2001 | Betz et al. |
| 6,472,026 B1 | 10/2002 | Maag et al. |
| 7,144,544 B2 * | 12/2006 | Bulluck et al. ................ 264/494 |
| 2003/0008934 A1 | 1/2003 | Zychowski et al. |
| 2003/0176527 A1 | 9/2003 | Votteler et al. |
| 2006/0199874 A1 | 9/2006 | Bhatt |
| 2007/0178263 A1 | 8/2007 | Guilleux et al. |
| 2009/0169783 A1 | 7/2009 | Rentschler et al. |
| 2009/0227698 A1 | 9/2009 | Votteler et al. |
| 2010/0092693 A1 * | 4/2010 | Park et al. ..................... 427/535 |
| 2010/0093884 A1 | 4/2010 | Spyrou et al. |

FOREIGN PATENT DOCUMENTS

| | | |
|---|---|---|
| DE | 41 33 290 | 4/1993 |
| DE | 197 09 467 | 10/1998 |
| DE | 197 57 080 | 6/1999 |
| DE | 100 27 670 A1 | 12/2001 |
| DE | 692 12 212 | 5/2002 |
| DE | 10 2004 038 274 | 3/2006 |
| DE | 10 2006 012274 A1 | 9/2007 |
| DE | 10 2007 020 474 | 11/2007 |
| DE | 10 2006 061 380 | 6/2008 |
| DE | 602 22 868 | 7/2008 |

OTHER PUBLICATIONS

"Ultraviolet-Curing Behavior of an Epoxy Acrylate Resin System" authored by Hong et al and published in the Journal of Applied Polymer Science (2005) 98, 1180-1185.*

* cited by examiner

Primary Examiner — Marc Zimmer
(74) Attorney, Agent, or Firm — DLA Piper LLP (US)

(57) ABSTRACT

A UV-curable composition for coating vehicle axles includes at least one aliphatic epoxy acrylate and at least one acrylate selected from the group consisting of aromatic epoxy acrylate and polyester acrylate as a photochemically crosslinkable component; at least one reactive diluent; at least one photoinitiator; and at least one filler and/or at least one pigment.

9 Claims, No Drawings

UV-CURABLE COMPOSITION AND THE USE THEREOF AS A COATING

RELATED APPLICATIONS

This is a §371 of International Application No. PCT/EP2009/000960, with an international filing date of Feb. 12, 2009 (WO 2009/100899 A1, published Aug. 20, 2009), which is based on German Patent Application No. 10 2008 010 346.2, filed Feb. 14, 2008, the subject matter of which is incorporated by reference.

TECHNICAL FIELD

This disclosure relates to a UV-curable composition and its use, in particular, in a process for coating substrates, such as commercial vehicle axles, and a cured coat comprising such a composition and a substrate which has such a composition or such a coat.

BACKGROUND

Parts of commercial vehicles, construction machines and agricultural machines, such as, for example, commercial vehicle axles, are frequently subjected to very severe stress by stonechips and corrosion during operation. By suitable coating of these parts, an attempt is made to provide simple and efficient protection from such chemical and mechanical stresses.

It could therefore be helpful to provide a technical solution which permits the provision of highly stressable parts of commercial vehicles, construction machines and agricultural machines which meet the highest requirements with regard to protection from corrosion and stonechips, with particular attention paid to the provision of a composition which is suitable for the coating of vehicle axles, in particular, commercial vehicle axles. During coating, the composition should have good hiding power in combination with good curing and adhesive properties on a very wide range of substrates. Furthermore, the composition should be capable of being applied by simple, conventional application methods.

SUMMARY

We provide a UV-curable composition for coating vehicle axles including at least one aliphatic epoxy acrylate and at least one acrylate selected from the group consisting of aromatic epoxy acrylate and polyester acrylate as a photochemically crosslinkable component.

We also provide a cured coat produced from the composition.

We further provide a substrate including the coat.

DETAILED DESCRIPTION

Our compositions can be cured by electromagnetic radiation, in particular, by UV radiation. It has at least one acrylate as a photochemically crosslinkable component, the acrylate being selected from the group consisting of: aromatic epoxy acrylate, aliphatic epoxy acrylate and polyester acrylate, preferably aliphatic polyester acrylate. Accordingly, the photochemically crosslinkable component may consist either of at least one aromatic epoxy acrylate or of at least one aliphatic epoxy acrylate or of at least one polyester acrylate or of any desired mixtures of these three acrylate types.

Particularly preferably, the composition always contains, as a photochemically crosslinkable component, at least one aliphatic epoxy acrylate and additionally either at least one aromatic epoxy acrylate or a preferably aliphatic polyester acrylate.

In addition, the composition contains at least one reactive diluent, preferably two or more reactive diluents, at least one photoinitiator, at least one filler and/or at least one pigment. One or more auxiliary additives are also preferably present.

Particularly preferably, the composition comprises, as photochemically crosslinkable components, both at least one aliphatic epoxy acrylate and at least one aromatic epoxy acrylate. In these cases, preferably no polyester acrylate is present in the photochemically crosslinkable component. Preferably, the composition then has, as crosslinkable components, only the at least one aliphatic epoxy acrylate and the at least one aromatic epoxy acrylate.

Further particularly preferably, the composition has, as photochemically crosslinkable components, both at least one aliphatic epoxy acrylate and at least one polyester acrylate, in particular, at least one aliphatic and/or at least one aromatic polyester acrylate. In these cases, preferably no aromatic epoxy acrylate is then present in the photochemically crosslinkable component. The absence of the aromatic epoxy acrylate may have the advantage that yellowing effects which occur when such aromatic components are exposed to light can be avoided. Preferably, the composition then has, as crosslinkable components, only the at least one aliphatic epoxy acrylate and the at least one polyester acrylate, in particular, the at least one aliphatic polyester acrylate.

An aromatic epoxy acrylate is to be understood as meaning, in particular, an epoxy acrylate which has one or more aromatic groups. An aliphatic epoxy acrylate on the other hand should, in particular, have no aromatic radicals or groups and preferably have only C atoms which are arranged in straight or branched chains. This applies analogously to the at least one aliphatic or aromatic polyester acrylate.

All acrylates, in particular both the at least one aromatic epoxy acrylate and the at least one aliphatic epoxy acrylate preferably have at least two, preferably from 2 to 20, ethylenic double bonds per molecule.

The at least one aromatic epoxy acrylate is preferably a novolac-modified epoxy acrylate, in particular, an epoxy novolac triacrylate. The latter is preferably used as a 70% strength epoxy novolac triacrylate in 2-phenoxyethyl acrylate (monomer).

The use of novolac-modified epoxy acrylates is very advantageous, especially with regard to corrosion protection and to chemical resistance and condensation resistance of the composition or of coats produced therefrom.

The at least one aliphatic epoxy acrylate is preferably a polyester-modified epoxy acrylate, in particular, a polyester-modified epoxy diacrylate. The use of polyester-modified epoxy diacrylates proves to be useful, in particular, with regard to the adhesion and the mechanical properties (protection from stonechip) of the composition or of coats produced therefrom.

The polyester acrylate is preferably an aliphatic polyester acrylate, in particular, a polyester diacrylate. A product which can be used is, for example, the product UVP6000 from Kromachem, Leverkusen, Germany.

The reactive diluents preferably chosen are those which are not volatile and can therefore be incorporated into the coat matrix. Thus, the final properties of a coat can also be influenced by suitable choice of reactive diluent.

Preferably, the composition contains a tetrahydrofurfuryl acrylate as a reactive diluent. Tetrahydrofurfuryl acrylates have a very good dilution effect. Moreover, in the case of the choice of this reactive diluent, an improvement in the protection from stonechips is surprisingly also observed.

Instead of the tetrahydrofurfuryl acrylate reactive diluent or in addition to it, the composition can, particularly preferably, contain a 2-phenoxyethyl acrylate. This surprisingly has, inter alia, a very positive effect on the anticorrosion properties of the composition or of a cured coat comprising the composition.

The composition preferably has an α-hydroxyketone, in particular, 2-hydroxy-2-methyl-1-phenylpropan-1-one, as a photoinitiator.

Furthermore, it may be preferred that the composition contains a bisacylphosphine as a photoinitiator, in particular, a bis(2,4,6-trimethylbenzoyl)phenylphosphine oxide.

The photoinitiators are responsible for the free radical photopolymerization if the composition is cured with electromagnetic radiation. It was found that the use of bisacylphosphines promotes thorough curing to a very great extent. With photoinitiators based on α-hydroxyketones, nontacky and very hard surfaces can be achieved.

As already mentioned, the composition preferably contains one or more auxiliary additives. These serve in particular for adjusting and stabilizing the properties of the composition and of the cured coat resulting therefrom. Examples of these are light stabilizers, such as commercially available UV absorbers (hydroxybenzophenones, benzotriazoles, oxalanilides) and free radical scavengers, such as sterically hindered amines (HALS).

Particularly preferably, it has an adhesion promoter as an auxiliary additive, preferably one based on (meth)acrylate, in particular, a phosphoric acid ester methacrylate. A suitable adhesion promoter is, for example, Ebecryl® 171, a product of Cytec.

Furthermore, it is preferred that the composition contains at least one antifoam, in particular, based on polysiloxane, as an auxiliary additive. A suitable antifoam is, for example, Tego® Twin 4000, a product of Tego.

Furthermore, one or more rheological additives, in particular, based on silicate, may be present as an auxiliary additive in the composition. An example of these is Bentone® SD2, which is sold by Rheox.

Thickeners, particularly inorganic thickeners, such as silica, and optionally also leveling agents may also be present as an auxiliary additive in a composition.

Both inorganic and organic pigments may be added as pigments to the composition. Carbon black, titanium dioxide and iron oxide may be mentioned here by way of example as pigments.

Suitable fillers are all known corresponding additives such as, for example, silica gels, limestone powder, dolomite, barium sulfate, aluminum oxide or talc. The composition is, however, particularly preferred when it contains quartz powder and/or talc as a filler.

The use of pigments and fillers in the form of finely milled types having a mean particle size of <20 μm, preferably <10 μm, is particularly advantageous.

For better incorporation of the pigments and/or fillers, the composition may contain wetting agents and dispersants as auxiliary additives. Suitable wetting agents and dispersants are known to those skilled in the art.

Preferably, the acrylates which form the photochemically crosslinkable component are present in the following proportions, namely:
  the at least one aromatic epoxy acrylate in proportions of up to 35% by weight;
  the at least one aliphatic epoxy acrylate in proportions of up to 25% by weight; and
  the at least one polyester acrylate, in particular, the at least one aliphatic polyester acrylate, in proportions of up to 50% by weight.

Particularly preferably, the compositions are distinguished in that they contain the following constituents in the following proportions:
  from 5 to 25% by weight of the at least one aliphatic epoxy acrylate;
  from 10 to 35% by weight of the at least one aromatic epoxy acrylate and/or from 10 to 50% by weight of the at least one polyester acrylate, in particular, of the at least one aliphatic polyester acrylate;
  from 20 to 50% by weight of the at least one reactive diluent;
  from 1 to 10% by weight of the at least one adhesion promoter;
  from 1 to 10% by weight of the at least one photoinitiator;
  from 15 to 35% by weight of the at least one filler and/or of the at least one pigment; and
  from 0.5% by weight to 10% by weight of the at least one further auxiliary additive in addition to the at least one adhesion promoter, in particular, from the group consisting of antifoams, rheological additives, leveling agents, dispersants and thickeners.

The stated proportions preferably sum to 100% by weight.

In principle, the composition may contain a proportion of one or more solvents. However, it is preferably substantially free of solvents. Instead, the viscosity can be adjusted, for example, by addition of suitable amounts of reactive diluents.

The viscosity of the acrylates (present as a rule as oligomers) is preferably in the range greater than 5 Pa·s (determined by means of a rotary viscometer according to DIN EN ISO 3219). The viscosity of the composition is preferably in the range from 100 mPa·s to 2000 mPa·s, values from 200 mPa·s to 1000 mPa·s being further preferred within this range.

As mentioned at the outset, the composition was developed, in particular, for the coating of vehicle axles, in particular, of commercial vehicle axles. Accordingly, the use of a composition as a coating composition, in particular, for coating substrates, such as vehicle axles, in particular, commercial vehicle axles, is also a part of this disclosure. Very generally, the possible use of the composition as a coating for assemblies in automotive construction, i.e., in particular, for engines, gears and parts thereof, should be singled out in particular.

For the coating of the substrates, a composition is applied to the substrate to be coated and is then cured.

Curing the composition preferably takes place under an inert gas atmosphere, but this measure is not absolutely essential. Preferably, curing is effected with UV radiation.

We also provide cured coats thus produced and substrates which have such a coat. As already discussed, the substrate is, in particular, a vehicle axle, particularly preferably a commercial vehicle axle.

A coat provides outstanding protection from surface and edge corrosion and from stonechips. Moreover, it has continuous heat resistance up to 140° C. It adheres very well to metals, such as steel and gray cast iron, and to various primed add-on parts (synthetic resin primer, zinc, zinc or iron phosphatizing, powder coating, cathodic dip coating). Particularly in solvent-free form, curing of the composition to give a coat can be effected within a few seconds. The coat can be overcoated with conventional coats without any problems (refinishing).

Further features are evident from the following example. Individual features can be realized in each case by themselves or as a plurality in combination with one another. The preferred compositions and coatings described serve merely for explanation and for a better understanding and are by no means to be understood as being limiting.

EXAMPLE

A preferred composition has the following 17 constituents:

| | Name | Chemical designation | Content |
|---|---|---|---|
| 1 | Photocryl E203/30PE (from PC-Resin) | Epoxy novolac triacrylate 70% strength in 2-phenoxyethyl acrylate (monomer) | 21.90 |
| 2 | Photocryl E207 (from PC-Resin) | Polyester-modified epoxy diacrylate | 11.27 |
| 3 | Sartomer 285 (from Cray Valley) | Tetrahydrofurfuryl acrylate THFA (monomer, MW 156) | 14.40 |
| 4 | Sartomer 399C (from Cray Valley) | 2-Phenoxyethyl acrylate PEA (monomer, MW 192) | 14.25 |
| 5 | Darocure 1173 (from Ciba) | 2-Hydroxy-2-methyl-1-phenylpropan-1-one (MW 164.2) | 3.20 |
| 6 | Irgacure ® 819 (from Ciba) | Bis(2,4,6-trimethylbenzoyl)phenylphosphine oxide (MW 418.5) | 0.80 |
| 7 | Ebecryl ® 171 (from Cytec) | Phosphoric acid ester methacrylate | 6.00 |
| 8 | Sikron SF 800 (from Quarzwerke) | Iron-free quartz powder | 20.00 |
| 9 | Luzenac 10M00S (from Luzenac) | Talc (10 μm particle size with low carbonate fraction) | 2.50 |
| 10 | Westmin 20 (from Omya) | Mg silicate (15 μm particle size) | 2.50 |
| 11 | HDK ® H18 (from Wacker) | Hydrophobic, amorphous silica | 1.60 |
| 12 | Bentone ® SD2 (from Rheox) | Bentonite, phyllosilicate | 0.38 |
| 13 | Flammruss 101 (from Degussa) | Coarse carbon black (95 nm particle size) | 0.30 |
| 14 | Kronos 2160 (from Kronos) | Titanium dioxide (rutile type) | 0.49 |
| 15 | Bayferrox ® 3920 (from Bayer) | Iron oxide α-FeOOH | 0.08 |
| 16 | Bayferrox ® 130M (from Bayer) | Micronized iron oxide | 0.035 |
| 17 | Tego ® Twin 4000 (from Tego) | Polysiloxane derivative | 0.30 |

For compliance with the VOC regulations, the composition was formulated absolutely solvent-free. Selected reactive diluents were used for adjusting the viscosity. The chosen reactive diluents have the advantage that they are incorporated into the coat matrix and are therefore not volatile. The composition according to the example has a viscosity in the range from 500 to 600 mPa·s.

The composition can be outstandingly applied and can be very rapidly cured by UV radiation. The combination of two photoinitiators ensures that the applied coat cures without problems at any desired point.

In cured form, the composition has outstanding properties with respect to stonechip and corrosion protection properties.

The invention claimed is:

1. An ultraviolet (UV)-curable composition for coating vehicle axles comprising:
   an aromatic epoxy acrylate;
   a polyester acrylate;
   a reactive diluent comprising tetrahydrofurfuryl acrylate and 2-phenoxyethyl acrylate;
   at least one photoinitiator; and
   at least one filler and/or at least one pigment.

2. The composition as claimed in claim 1, wherein the acrylates have at least two ethylenic double bonds per molecule.

3. The composition as claimed in claim 1, wherein the polyester acrylate is an aliphatic polyester acrylate.

4. The composition as claimed in claim 1, wherein the polyester acrylate is a polyester diacrylate.

5. The composition as claimed in claim 1, further comprising an adhesion promoter containing (meth)acrylate moieties as an auxiliary additive.

6. The composition as claimed in claim 1, which is substantially free of solvents.

7. The composition as claimed in claim 1, having a viscosity in a range from 100 mPa·s to 2000 mPa·s as determined by a rotary viscometer according to DIN EN ISO 3219.

8. A cured coat produced from a composition as claimed in claim 1.

9. A substrate comprising the coat as claimed in claim 8.

* * * * *